Figure 1:
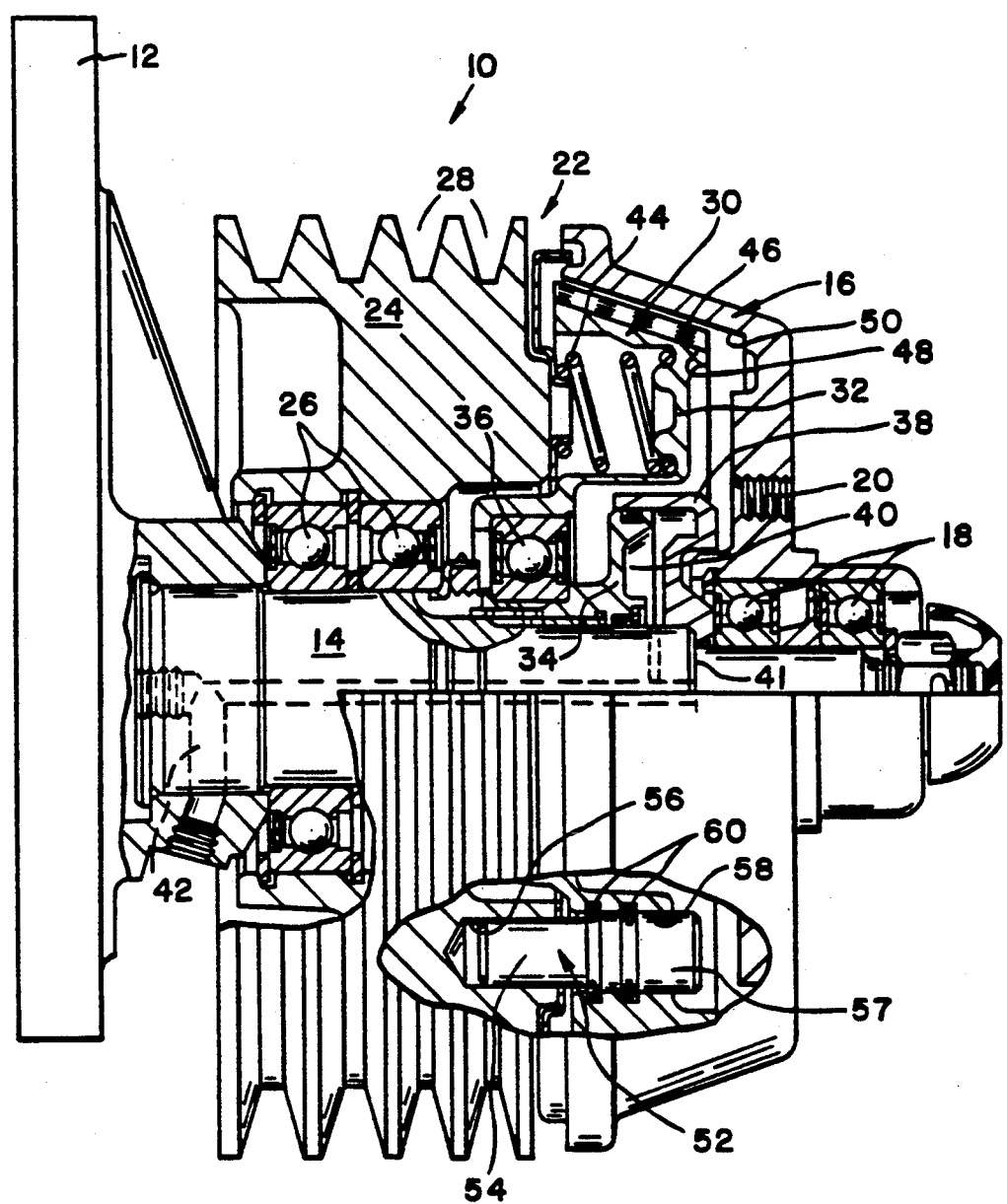

United States Patent [19]
Fenzel

[11] Patent Number: 5,215,175
[45] Date of Patent: Jun. 1, 1993

[54] CLUTCH DRIVE MECHANISM
[75] Inventor: David T. Fenzel, Grafton, Ohio
[73] Assignee: Allied-Signal Inc., Morristown, N.J.
[21] Appl. No.: 808,341
[22] Filed: Dec. 16, 1991
[51] Int. Cl.[5] ............................................. F16D 25/08
[52] U.S. Cl. ............................ 192/91 A; 192/85 CA
[58] Field of Search .................. 192/66, 85 CA, 91 A, 192/30 V, 70.19

[56] References Cited

U.S. PATENT DOCUMENTS

| | | | |
|---|---|---|---|
| 3,016,121 | 1/1962 | Mosbacher | 192/91 A X |
| 3,997,042 | 12/1976 | Langham | 192/91 A X |
| 4,078,637 | 3/1978 | Hanes | 192/91 A X |
| 4,226,318 | 10/1986 | Morgan | 192/85 CA |
| 4,445,605 | 5/1984 | Schilling | 192/91 A |
| 4,460,079 | 7/1984 | Hanks | 192/91 A X |
| 4,483,430 | 11/1984 | Carmichael et al. | 192/91 A |
| 4,541,516 | 9/1985 | Fenzel | 192/85 CA |
| 4,638,900 | 1/1987 | Deem et al. | 192/85 CA |

Primary Examiner—Rodney H. Bonck
Assistant Examiner—Andrea Pitts
Attorney, Agent, or Firm—Ken C. Decker; William N. Antonis

[57] ABSTRACT

A clutch drive mechanism for the cooling fan of an automotive engine includes a driving member rotated by the vehicle engine and a driven member carrying fan blades. The driving member includes an axially movable portion which is rotated through drive pins slidably received in bores in the axially movable portion. Resilient grommets are carried in the walls of the bores and engage the pin to prevent noise and rattling as the clutch members are engaged and disengaged. Grooves are provided on the pins which receive the grommets when the axially movable portion is in the fully disengaged position, which allows the axially movable portion to move to a truly centered position with respect to the spindle, thereby eliminating stress on the components when the mechanism is in the released condition.

8 Claims, 1 Drawing Sheet

U.S. Patent — June 1, 1993 — 5,215,175

CLUTCH DRIVE MECHANISM

This invention relates to a clutch drive mechanism for operating the cooling fan of a vehicle engine.

To achieve maximum fuel economy, it has become customary to provide a clutch drive mechanism which disconnects the cooling fan from its driving connection to the vehicle engine when the cooling effect of the fan is not necessary. Since the cooling fan is necessary in many applications only a very small percentage of the time that the engine is operated, substantial savings in fuel can be achieved. The present invention relates to a fan drive for a heavy duty vehicle, such as an over-the-road, line haul truck. These trucks are commonly equipped with a braking system that is operated by compressed air, accordingly, the compressed air is also used as a power source for operating the fan. Prior art fan drives of this type are disclosed in U.S. Pat. Nos. 4,483,430 and 4,638,900.

One problem with prior art fan drives is that some of the components, such as the spring plate and the bearing supporting the spring plate, exhibit premature wear and failure. Investigation has resulted in the conclusion that this premature wear is because tolerance stackup prevented the spring plate from moving to a true centered position on the spindle when the mechanism was disengaged because resilient vibration isolators, which support the spring plate on drive pins which drive the spring plate, did not allow for the components to reach a true centered position. Accordingly, the present invention permits the isolators to move to a position where they do not restrict radial concentricity between the spring plate and the spindle when the drive mechanism is disengaged.

Figure 2:
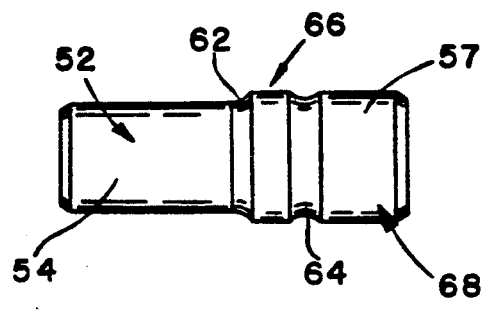

These and other advantages of the present invention will become apparent from the following description, with reference to the accompanying drawings, in which:

FIG. 1 is a partial cross-sectional view of a fan drive mechanism made pursuant to the teachings of the present invention; and FIG. 2 is an enlarged view of the drive pins used in the fan drive mechanism illustrated in FIG. 1.

Referring now to the drawings, a fan drive mechanism generally indicated by the numeral 10 includes a bracket 12 which is securely mounted on a non-rotating portion of the vehicle. A spindle 14 projects from the bracket 12. A driven member 16 is rotatably mounted on the spindle 14 by conventional bearings 18. Fan blades (not shown) are bolted to driven member 16 by bolts received in threaded apertures 20. The driven member 16 is rotated, when the mechanism 10 is engaged, by power transmitted from a driving member generally indicated by the numeral 22. Driving member 22 includes an axially immovable portion 24 which is rotatably mounted on spindle 14 by bearings 26. Portion 24 is provided with pulley faces 28 for engagement with a conventional drive belt (not shown) for providing a driving connection between the portion 24 and the vehicle engine.

Driving member 22 includes an axially movable portion generally indicated by the numeral 30. Portion 30 includes a collar 32 which is mounted for rotation about a piston 34 by a bearing 36. The piston 34 is mounted for axially sliding movement along the spindle 14 and thus carries both the bearing 36 and collar 32 toward and away from the driven member 16. Piston 34 is slidably received in a cup-shaped cylinder 38 which is clamped between shoulder 41 on spindle 14 and the bearings 18. Accordingly, piston 34 cooperates with cylinder 38 to define a variable volume cavity 40 therebetween. Passages 42 indicated by the dashed lines within the spindle 14 are provided to selectively communicate compressed air into, and to exhaust compressed air from, the cavity 40 to thereby effect movement of the piston 34. Circumferentially spaced springs, only one of which being shown as at 44, are disposed at arcuate intervals around the driving member 22 to urge the axially movable portion 30 to the right, viewing FIG. 1. Friction material 46 is mounted on conical surface 48 of the collar 32 for driving engagement with a corresponding conical surface 50 on the driven member 16.

The driving connection between the portions 24, 30 is effected through drive pins generally indicated by the numeral 52. Drive pins 52 are spaced circumferentially about the driving member 22, but only one of them is illustrated in FIG. 1. One end 54 of drive pins 52 are force fitted into bores 56 provided in portion 24. The other end 57 of the pins 52 have a diameter larger than that of the end 54 and are slidably received within bores 58 provided in portion 30. Accordingly, rotation of the portion 24 by the drive belt (not shown) engaging pulley faces 28 will be transmitted to the axially movable portion 30 through the drive pins 52 acting against the bores 58.

It will be recognized that torque reversals will be transmitted through the axially movable portion as the latter is engaged and disengaged with the driven member 16. These torque reversals would normally cause the pins 52 to rattle against the walls of the bore 58, causing unpleasant noise. Accordingly, circumferentially extending rubber grommets 60 are carried in the wall of the bore 58 and resiliently bear against the drive pins 52, thereby damping the torque reversals to reduce or eliminate the rattling and vibrations causing noise. Although the grommets 60 are effective to prevent rattling as the portion 30 disengages from driven member 16, they continue to exert a radial bias on the collar 32 when the portion 30 is in the fully disengaged position. This bias prevents the portion 30 from moving radially to a truly centered position on spindle 14. This radial offset, if coupled with a normal tolerance stackup, can cause premature wear of collar 32, piston 34, and bearing 36 due to interference with other components. To overcome this problem, circumferentially extending reliefs or grooves 62, 64 are provided in the drive pins 52. When the portion 30 is engaged with the driven member 16, the grommets or noise isolators 60 bear against the surfaces 66, 68 of the drive pins 52 (see FIG. 2). However, when compressed air is admitted into the variable volume chamber 40 thereby driving the portion 30 to the left, viewing FIG. 1, the isolators or grommets 60 slide across the surfaces 66 and 68 and slip down into the grooves 62, 64 when the axially movable portion 30 reaches the fully disengaged position. Accordingly, limited radial movement of the portion 30 is permitted, permitting the latter to move to a truly concentric position with respect to the spindle 14, thereby relieving stresses on the collar 32, bearing 36 and piston 34 which would otherwise occur and result in premature wear of these members.

When the drive mechanism 10 is later engaged, the pressure in variable volume cavity 40 is vented, permitting the springs 44 to urge portion 30 back into driving engagement with the driven member 16. As this occurs, the grommets or isolators 60 ride up and out of the grooves 62, 64, and back onto the surfaces 66, 68, thereby resuming their isolating function. It will be noted that the grommets do not reach the grooves 62, 64 until the portion 30 moves into the fully disengaged position, so that the isolating grommets 60 perform their noise and rattle absorbing function as the portion 30 is moved toward and away from the engaged position.

I claim:

1. Clutch drive mechanism comprising a spindle, a driven member and a driving member mounted for rotation about said spindle, said driving member including an axially movable portion and an axially immovable portion, drive pins spaced circumferentially around said spindle and carried by said axially immovable portion, said axially movable portion slidably engaging said drive pins for driving said axially movable portion for rotation with the axially immovable portion and for guiding the axially movable portion for movement toward and away from the driven member, resilient means urging the axially movable portion toward an engaged position in driving engagement with the driven member, fluid pressure responsive means for driving the axially movable member toward a disengaged position out of driving engagement with the driven member in opposition to the resilient means, said axially movable portion being supported on said drive pins by yieldable means when the axially movable portion is in the engaged position to resist radial movement of the latter relative to the spindle, and relieved portions on said pins receiving the yieldable means when the axially movable portion is in the disengaged position to permit limited radial movement of the axially movable portion with respect to said spindle when the axially movable portion is in the disengaged position.

2. Clutch drive mechanism as claimed in claim 1, wherein said yieldable means are resilient grommets circumscribing said pins.

3. Clutch drive mechanism as claimed in claim 2, wherein said axially movable portion includes circumferentially spaced bores, each of said bores receiving a corresponding pin, said grommets being carried on the wall of the bore circumscribing said pins.

4. Clutch drive mechanism as claimed in claim 3, wherein said relieved portions are grooves extending circumferentially about said pins.

5. Clutch drive mechanism as claimed in claim 1, wherein said relieved portions are grooves extending circumferentially about said pins.

6. Clutch drive mechanism comprising a spindle, a driven member and a driving member mounted for rotation about said spindle, said driving member including an axially movable portion and an axially immovable portion, drive pins spaced circumferentially around said spindle and carried by said axially immovable portion, said axially movable portion slidably engaging said drive pins for driving said axially movable portion for rotation with the axially immovable portion and for guiding the axially movable portion for movement toward and away from the driven member, resilient means urging the axially movable portion toward an engaged position in driving engagement with the driven member, fluid pressure responsive means for driving the axially movable member toward a disengaged position out of driving engagement with the driven member in opposition to the resilient means, said axially movable portion being supported on said drive pins by yieldable means when the axially movable portion is in the engaged position to resist radial movement of the latter relative to the spindle, and grooves on said pins receiving the yieldable means when the axially movable portions is in the disengaged position to permit limited radial movement of the axially movable portion with respect to said spindle when the axially movable portion is in the disengaged position.

7. Clutch drive mechanism as claimed in claim 6, wherein said yieldable means are resilient grommets circumscribing said pins.

8. Clutch drive mechanism as claimed in claim 7, wherein said axially movable portion includes circumferentially spaced bores, each of said bores receiving a corresponding pin, said grommets being carried on the wall of the bore circumscribing said pins.

* * * * *